United States Patent [19]
Kodama et al.

[11] Patent Number: 5,842,042
[45] Date of Patent: *Nov. 24, 1998

[54] DATA TRANSFER CONTROL METHOD FOR CONTROLLING TRANSFER OF DATA THROUGH A BUFFER WITHOUT CAUSING THE BUFFER TO BECOME EMPTY OR OVERFLOW

[75] Inventors: Satoshi Kodama, Yokohama; Mikito Ogata, Minami-ashigara; Shigeru Kaga, Odawara; Shinjiro Shiraki, Kanagawa-ken, all of Japan

[73] Assignees: Hitachi, Ltd., Tokyo; Hitachi Computer Engineering Co., Ltd.; Hitachi Computer Peripherals Co., Ltd., both of Kanagawa-Ken, all of Japan

[ * ] Notice: The term of this patent shall not extend beyond the expiration date of Pat. No. 5,623,607.

[21] Appl. No.: 769,217
[22] Filed: Dec. 18, 1996

Related U.S. Application Data

[63] Continuation of Ser. No. 314,782, Sep. 29, 1994, Pat. No. 5,623,607.

[30] Foreign Application Priority Data

Oct. 5, 1993 [JP] Japan .................................. 5-249077

[51] Int. Cl.$^6$ ...................................................... G06F 13/00
[52] U.S. Cl. .......................................... 395/849; 395/872
[58] Field of Search ................................... 395/872, 873, 395/876, 877, 200, 62, 200.63, 200.64, 200.65, 200.61, 849

[56] References Cited

U.S. PATENT DOCUMENTS

| | | | |
|---|---|---|---|
| 3,648,247 | 3/1972 | Guzak, Jr. ................................. | 395/872 |
| 4,258,418 | 3/1981 | Heath ....................................... | 395/873 |
| 4,425,762 | 1/1984 | Milligan et al. ......................... | 395/872 |
| 4,860,244 | 8/1989 | Bruckert et al. ........................ | 395/872 |
| 5,117,486 | 5/1992 | Clark et al. .............................. | 395/308 |
| 5,301,351 | 4/1994 | Jippo ....................................... | 395/872 |

*Primary Examiner*—Richard L. Ellis
*Attorney, Agent, or Firm*—Antonelli, Terry, Stout & Kraus, LLP

[57] ABSTRACT

A data transfer control system in a data transfer apparatus including a plurality of data processing units having different data transfer speeds and a temporary holding circuit provided between the data processing units for temporarily holding data transferred between the data processing units. The data transfer apparatus sends a transfer request for data corresponding to a data storage capacity of the temporary holding circuit of the data transfer apparatus to the data processing unit on the side of sending data and sends a transfer request for data corresponding to the data storage capacity of the temporary holding circuit after an elapse of a delivering time of data to an information processing unit on the data transferred side of the temporary holding circuit from the time the data transfer request is sent until the requested data from the data processing unit on the data sending side reaches the temporary holding circuit of the data transfer apparatus.

15 Claims, 3 Drawing Sheets

DATA TRANSFER CONTROL METHOD FOR CONTROLLING TRANSFER OF DATA THROUGH A BUFFER WITHOUT CAUSING THE BUFFER TO BECOME EMPTY OR OVERFLOW

This is a Continuation of application Ser. No. 08/314,782 filed Sep. 29, 1994, now U.S. Pat. No. 5,623,607, the subject matter of which is incorporated herein by reference.

BACKGROUND OF THE INVENTION

The present invention relates to a data transfer control system for controlling a data request to a higher-rank CPU upon transfer of write data from the higher-rank CPU by means of the packet communication or the like in a lower-rank information recording sub-system connected to a higher-rank apparatus such as the higher-rank CPU or the like.

A communication control unit such as an optical communication control unit or the like used in such a lower-rank information recording sub-system includes a buffer for controlling a different transfer speed (input from the higher-rank CPU and output to a lower-rank memory unit) and requests the higher-rank CPU to send data for the size or capacity of the buffer upon control of writing. Once the request of data for the buffer capacity is performed, the data request is stopped and the communication control unit waits until the data for one request is delivered from the buffer to a lower-rank memory unit provided at a lower-rank position. When the data for one request is delivered, the communication control unit transmits the data request to the higher-rank CPU again. The communication control unit controls the data transfer from the higher-rank CPU to the lower-rank memory unit by repetition of the above operation. A conventional data transfer control system described above is disclosed in JP-A-4-225452.

With such a conventional system, however, as a length of the communication cable for connecting the higher-rank CPU and the information recording sub-system is made longer, there is a case where a time from the data request to the data arrival therefor in the information recording sub-system exceeds the data delivering time of the buffer in the full state. In the request of data for the buffer capacity, even if a next data request is sent after the data has been reached in the buffer once, the delivering of data to the lower-rank memory unit from the buffer is completed earlier before the next data is received. Accordingly, an empty state of the buffer occurs and the data transfer is interrupted during the empty state of the buffer, so that the buffer is not used efficiently.

SUMMARY OF THE INVENTION

The cause that the buffer becomes empty is that the next data request to the higher-rank CPU is stopped until data is reached when the request of data for the buffer capacity is sent from the communication control unit to the higher-rank CPU. The reason why the data request is stopped is that data is prevented from overflowing from the buffer (a pointer at an input side is prevented from passing a pointer at an output side). Accordingly, in order to prevent data from being interrupted in the buffer while avoiding the data from overflowing from the buffer when the data request is sent to the higher-rank CPU from the communication control unit, the data request is sent with an interval corresponding to a delivering time of data for one data request from the buffer to the lower-rank memory unit between sending of the data request and sending of the next data request, so that an interval of sending the data request from the information recording sub-system to the higher-rank CPU is maintained to be fixed.

According to the present invention, utilization of a transfer delay time due to a length of cable for connecting the information recording sub-system and the higher-rank CPU can take data into the buffer periodically and since the buffer does not become the empty state, a transfer waiting time to the lower-rank memory unit can be removed to attain efficient data transfer.

DESCRIPTION OF THE PREFERRED EMBODIMENT

Figure 1:
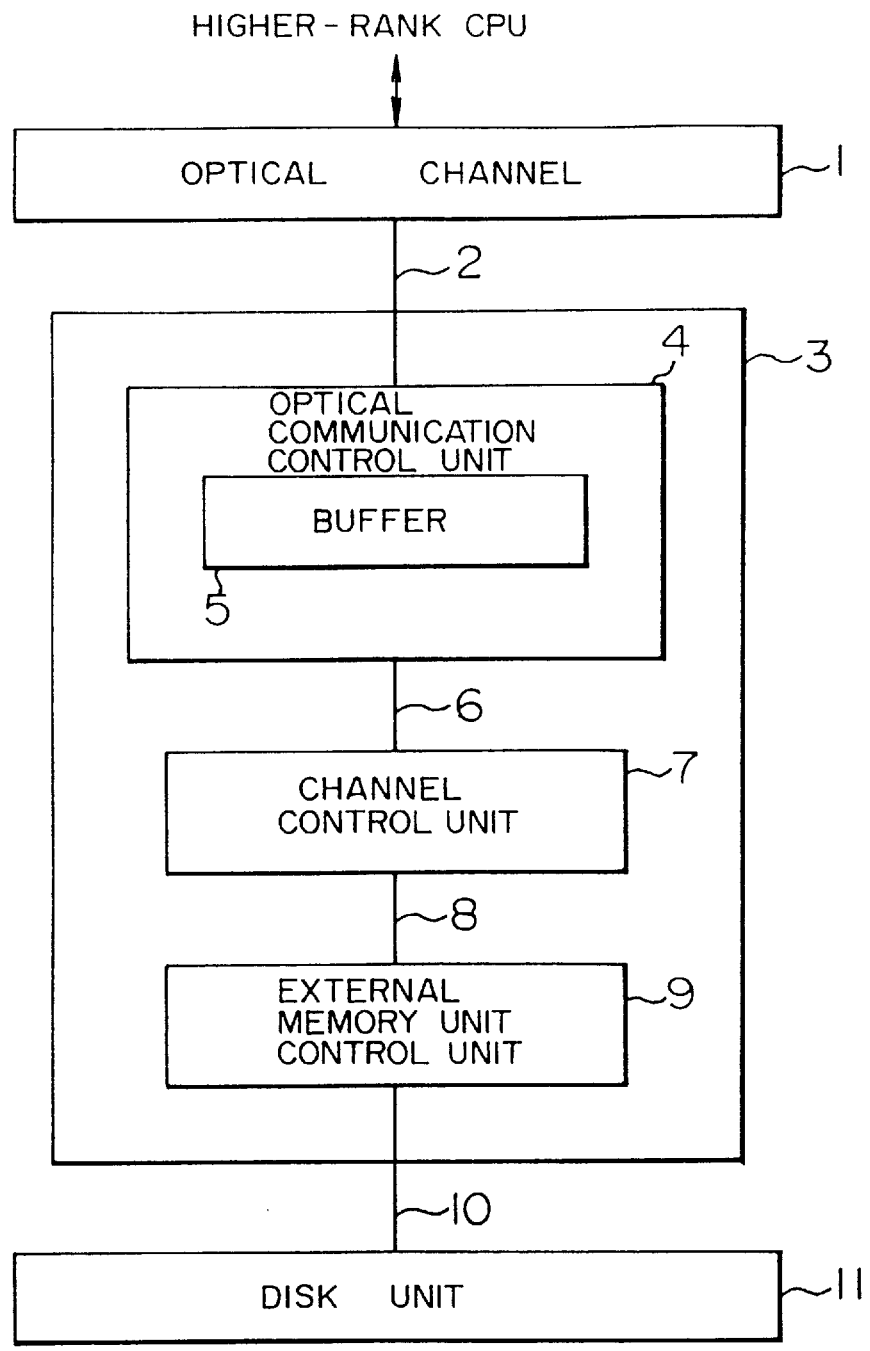
FIG. 1 is a schematic diagram illustrating a disk sub-system including an optical communication control unit according to an embodiment of the present invention.

FIG. 1 is a schematic diagram illustrating a disk unit sub-system according to an embodiment of the present invention.

In FIG. 1, a disk control unit 3 includes an optical communication control unit 4 for controlling a communication protocol with a higher-rank optical channel 1, an external memory control unit 9 for controlling a lower-rank disk unit 11 and a channel control unit 7 communicating with both of them. The control units are connected through an optical fiber cable 2, a path 6 between the optical communication control unit and the channel control unit, a path 8 between the channel control unit and the external memory control unit, and a path 10 between the external memory control unit and the disk unit. Further, the higher-rank optical channel 1 is connected to a higher-rank CPU (not shown).

The optical communication control unit 4 includes a buffer 5 and stores write data from the higher-rank CPU through the optical channel 1 and read data from the disk unit 11 into the buffer 5 to thereby perform data transfer. The data stored in the buffer 5 is transferred to the channel control unit 7 or the higher-rank optical channel 1 by means of the hardware control of the optical communication control unit 4.

Figure 2:
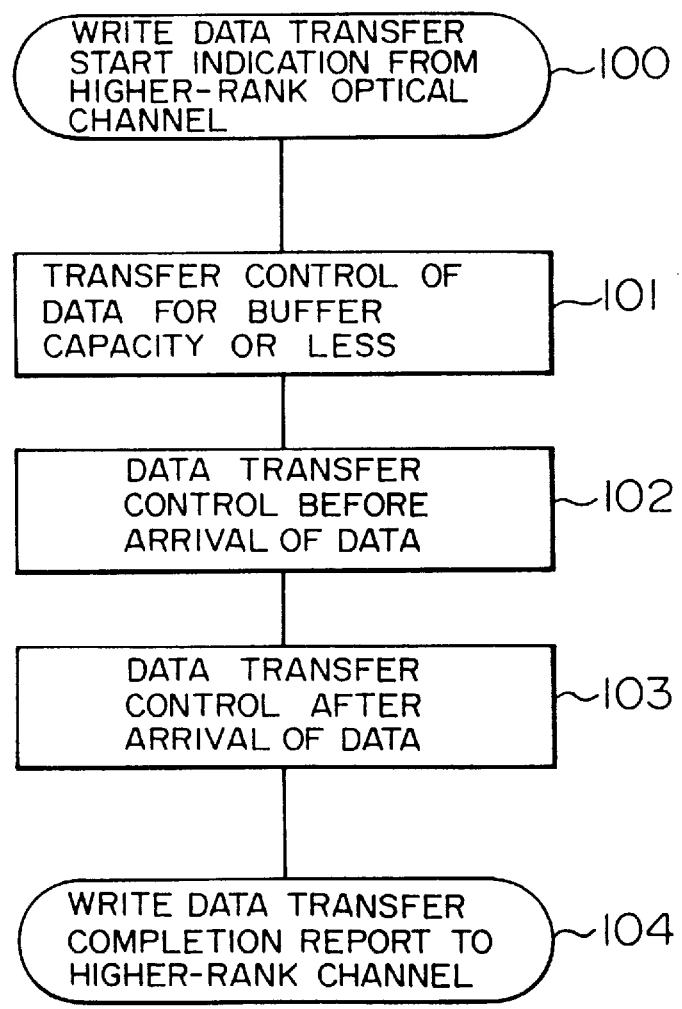
FIG. 2 is a flow chart showing microprogram control of the optical communication control unit according to the embodiment of the present invention.

FIG. 2 is a flow chart showing the write data transfer control of the optical communication control unit in the embodiment of the present invention.

Figure 3:
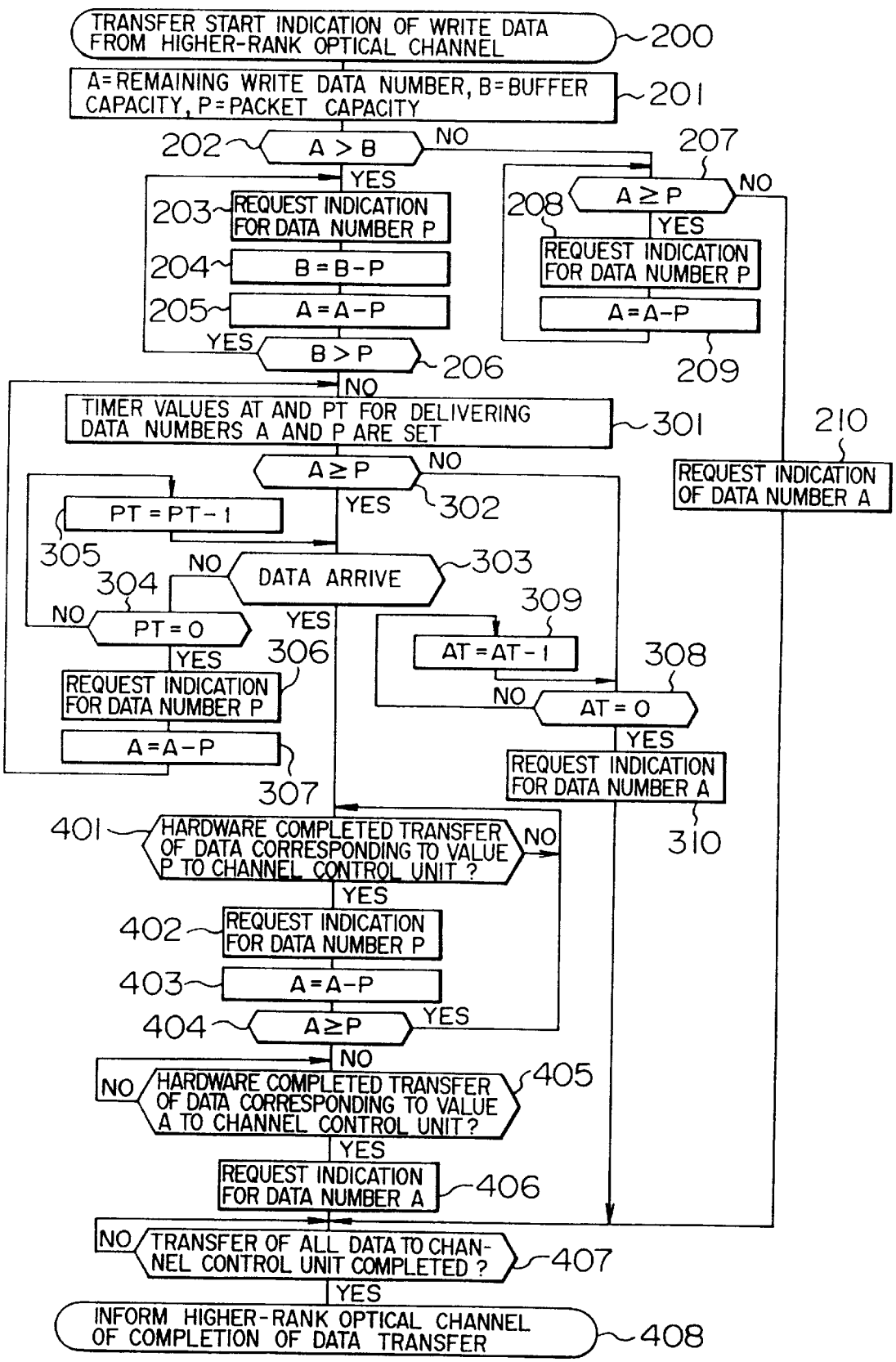
FIG. 3 is a detailed flow chart showing microprogram control of the optical communication unit according to the embodiment of the present invention.

FIG. 3 is a detailed flow chart of the write data transfer control of the optical communication control unit in the embodiment of the present invention.

Referring now to FIG. 1 and the flow chart of FIG. 2, the flow of control is described in brief. First of all, the write data transfer is started from (step 100). The write data transfer control involves the data transfer control (step 101) of data for the buffer capacity or less at the beginning of the control, the data transfer control (step 102) before arrival of data, and the data transfer control (step 103) after arrival of data. After execution of the data transfer control, the data transfer is finished (step 104).

In the transfer control (steps 101, 201 to 210) of data for the buffer capacity or less, the request of data for the capacity of the buffer 5 or less is indicated to the optical channel 1.

Once the request of data for the capacity of the buffer 5 or less is first indicated in step 101, the process proceeds to the data transfer control before arrival of data at the next step 102.

In the data transfer control (steps 102, 301 to 310) before arrival of data, the optical communication control unit 4 monitors a logical empty state of the buffer and indicates the data request to the optical channel 1. In the monitoring process of the logical empty state of the buffer, the data transfer from the buffer 5 to the channel control unit 7 by the physical hardware control is not performed yet before arrival of data and accordingly the empty state of the buffer 5 is monitored from an average data transfer speed of the hardware control for each transfer control request of data for the buffer capacity or less at step 101 to indicate the data request.

Thereafter, when the first data for the buffer capacity or less requested at step 101 is reached, the process proceeds to the data transfer control after arrival of data at step 103.

In the data transfer control (steps 103, 401 to 408) after arrival of data, the optical communication control unit 4 monitors the physical empty state of the buffer and indicates the data request to the optical channel 1. In the monitoring process of the physical empty state of the buffer, the data transfer from the buffer 5 to the channel control unit 7 by the hardware control is performed by the optical communication control unit 4 after arrival of the data and accordingly the empty state of the buffer 5 is monitored by the hardware control to indicate the data request for data left at steps 101 and 102.

Referring now to FIG. 1 and the flow chart of FIG. 3, the control flow of the write data transfer of the optical communication control unit 4 is described in detail.

First of all, as an initial value of a remaining number A of write data, the number of whole write data obtained by the start indication of the write data transfer from the higher-rank CPU is set. The buffer capacity B represents the number of data capable of being stored in the buffer 5. The packet capacity P represents the maximum number of data capable of being stored in a packet. A delivering timer value AT of the data number A represents a timer value (hour) of delivering data for the data number A starting from a final data request indication to proceed from step 102 to 103 on the basis of the average data transfer speed from the buffer 5 to the channel control unit 7 by the hardware control. Finally, a delivering timer value PT of the data number P represents a timer value (hour) of delivering data for the data number P from the buffer 5 starting from the final data request indication to proceed from step 102 to 103 on the basis of the average data transfer speed from the buffer 5 to the channel control unit 7 by the hardware control.

As shown at step 101 of FIG. 2, the transfer control of write data for the capacity or less of the buffer 5 is first described. The write data transfer is started from step 200 in response to the transfer start indication of the write data to the optical communication unit 4 from the higher-rank optical channel 1. Then, values A, B and P are set as the whole write data number, the buffer capacity, and the packet capacity, respectively (step 201).

Thus, when the remaining write data number is larger than the buffer capacity (A>B) (step 202), the request indication (step 203) of data corresponding to the value P to be stored in the buffer 5 in a unit of the packet capacity is performed to the higher-rank CPU in order to perform the request of data for the buffer capacity or less to the higher-rank CPU. Then, in order to monitor the data request indication number, the value P is subtracted from the values B and A (B=B−P and A=A−P) (steps 204 and 205). In order to control the transfer of write data within the buffer capacity, steps 203–205 are repeated as far as the value B is larger than the value P (B>P) (step 206). When the value P becomes larger than the value B, the process proceeds to step 301.

Further, when the remaining write data number is not larger than the buffer capacity (step 202), the data request indication (step 208) is performed to the higher-rank CPU in a unit of the packet capacity as far as the value A is larger than or equal to the value P (A≧P) (step 207), and in order to monitor the data request indication number, the value P is subtracted from the value A (A=A−P) (step 209). Finally, when the value A is smaller than the value P (step 207), the request indication of data corresponding to the value A is performed to the higher-rank CPU (step 210) and the process proceeds to step 407.

Control until arrival of data requested up to step 206, which is a point of the present invention, is now described. The values AT and PT for performing the data request indication are first set to timers (step 301). Then, as long as the value A is larger than or equal to the value P (A≧P) (step 302), the logical buffer empty state is monitored in order to further perform the request of data requested up to step 206. That is, while the arrival of data is monitored (step 303), the arrival state to the buffer 5 of the data requested up to step 206 is monitored on the basis of the average data transfer speed of the hardware control. More particularly, for the purpose of monitoring of a delivering time of the data corresponding to the value P, a timer value is subtracted from the value PT (step 305) and the data arrival is monitored (step 303) until the value PT is equal to zero (PT=0). When the delivering time of data corresponding to the value P elapses from the final data request indication at step 203 before arrival of data (PT=0) (step 304), the request indication of data corresponding to the value P is performed to the higher-rank CPU (step 306) and the value P is subtracted from the value A (step 307). Thus, the monitoring of the data arrival and the delivering time of data corresponding to the value P is performed again (steps 303–305). When data at the head of the data requested at step 203 has arrived (step 303), the process proceeds to step 401. Then, when the remaining write data number from the higher-rank CPU is smaller than the packet capacity before arrival of data (step 302), the delivering time AT of data corresponding to the value A is monitored from the final data request indication at step 306 (step 308). The request indication of data number A is performed (step 310) to the higher-rank CPU and the process proceeds to step 407.

Finally, control after arrival of data is described. Data reached or stored in the buffer 5 is transferred to the channel control unit 7 by the hardware control. The data request after arrival of data is switched from the method of performing the data request by the delivering time for one packet before arrival of data to the method of monitoring in the buffer 5 that transfer of data for one packet to the channel control unit is completed. At step 401, sending of data to the channel control unit 7 by the hardware control is monitored from the final data request indication at step 306 and when the hardware has completed transfer of data corresponding to the value P to the channel control unit 7, the request indication of data corresponding to the value P is performed to the higher-rank CPU (step 402) and the value P is subtracted from the value A (step 403). As long as the value A is larger than or equal to the value P (A≧P), the process at steps 401–403 is repeated. When the value A is smaller than the value P, sending of data to the channel control unit 7 by the hardware control is monitored from the final data request indication and when the hardware has completed transfer of data corresponding to the value A to the channel control unit 7, the final request indication of data corresponding to the value A is performed to the higher-rank CPU (step 406) and the process proceeds to step 407.

Finally, sending of data to the channel control unit 7 by the hardware control is monitored (step 407) and when data for the whole write data number can be sent to the channel control unit 7, the write data transfer is finished (step 408). This method is performed in order to improve the reliability of data transfer.

In the configuration of the embodiment, even if the length of cable is varied, a fixed transfer speed can be maintained by sending the request of a fixed amount of data at intervals of a fixed time.

We claim:

1. A data processing system comprising:

a data transfer apparatus for controlling data transfer through a buffer;

a first data processing apparatus for transferring data with said data transfer apparatus through a first bus which transfers data at a first transfer speed; and a second data processing apparatus for transferring data with said data transfer apparatus through a second bus which transfers data at a second transfer speed different from said first transfer speed, wherein said data transfer apparatus transmits data transfer requests to said first data processing apparatus which supplies data by transfer units predetermined between said first data processing apparatus and said data transfer apparatus so as to transfer data less than data storing capacity of said buffer, wherein said data transfer apparatus transmits data transfer requests to said first data processing apparatus at each sweep-out time for sweeping out a transfer unit of data from said buffer to said second data processing apparatus with said second data transfer speed until data transferred from said first data processing apparatus arrives at said data transfer apparatus, and said data transfer apparatus transmits data transfer requests to said first data processing apparatus at each of said data transfer units in response to the data transfer of said transfer unit from said data transfer apparatus to said second data processing apparatus after said data from said first data processing apparatus arrived at said data transfer apparatus.

2. A data processing system according to claim 1, wherein said data transfer apparatus determines said sweep-out time based on average data transfer speed from said buffer to said second data processing apparatus.

3. A data processing system according to claim 1, wherein said data transfer apparatus receives a data transfer start instruction from said first data processing apparatus, and also receives information indicating the number of data to be supplied from said first data processing apparatus.

4. A data processing system according to claim 3, wherein said data transfer apparatus repeats data transfer requests to said first data processing apparatus at each transfer unit until all the data indicated by said information is outputted from said first data processing apparatus.

5. A data processing system according to claim 4, wherein said data transfer apparatus notifies termination of data transfer to said first data processing apparatus when all of the data indicated by said information has been transferred to said second data processing apparatus.

6. A data processing system comprising:

a data transfer apparatus for controlling data transfer through a buffer;

a first data processing apparatus for transferring data with said data transfer apparatus through a first bus which transfers data at a first transfer speed; and a second data processing apparatus for transferring data with said data transfer apparatus through a second bus which transfers data at a second transfer speed different from said first transfer speed, wherein said data transfer apparatus transmits data transfer requests to said first data processing apparatus which supplies data by a transfer unit predetermined between said first data processing apparatus and said data transfer apparatus so as to transfer data less than data storing capacity of said buffer, and wherein said data transfer apparatus transmits data transfer requests with said data transfer unit at each sweep-out time for sweeping out a transfer unit of data from said data buffer with said second data transfer speed to said second data processing apparatus.

7. A data processing system according to claim 6, wherein said data transfer apparatus determines said sweep-out time based on average data transfer speed from said buffer to said second data processing apparatus.

8. A data processing system according to claim 6, wherein said data transfer apparatus receives a data transfer start instruction from said first data processing apparatus, and also receives information indicating the number of data to be supplied from said first data processing apparatus.

9. A data processing system according to claim 8, wherein said data transfer apparatus repeats data transfer requests to said first data processing apparatus at each transfer unit until all the data indicated by said information is outputted from said first data processing apparatus.

10. A data processing system according to claim 9, wherein said data transfer apparatus notifies termination of data transfer to said first data processing apparatus when all of the data indicated by said information has been transferred to said second data processing apparatus.

11. A control method in a data transfer apparatus of controlling data transfer through a buffer among a plurality of data processing apparatuses each having a different data transfer speed, said control method comprising the steps of:

transmitting a data transfer request for each of a plurality of transfer units predetermined between said first data processing apparatus and said data transfer apparatus so as to transfer data less than a data storing amount of said buffer to said first data processing apparatus which supplies data, and transmitting data transfer requests for said each data transfer unit to said data processing apparatus each sweep-out time for sweeping out said each transfer unit of data from said buffer to said second data processing apparatus for receiving data from said buffer.

12. A control method according to claim 11, wherein said sweep-out time is determined based on average data transfer speed from said buffer to said second data processing apparatus.

13. A control method according to claim 11, further comprising the steps of:

receiving data transfer start instructions from said first data processing apparatus, and information indicating the number of data to be supplied from said first data processing apparatus.

14. A control method according to claim 13, further comprising the steps of:

repeating data transfer requests to said first data processing apparatus at said each transfer unit until all the data indicated by said information is outputted from said first data processing apparatus.

15. A control method according to claim 14, further comprising the steps of:

monitoring data transfer from said buffer to said second data processing apparatus; and notifying termination of data transfer to said first data processing apparatus when all of the data indicated by said information has been transferred to said second data processing apparatus.

* * * * *